No. 684,078. Patented Oct. 8, 1901.
W. H. MARTIN.
BREAST PUMP.
(Application filed Mar. 1, 1901.)
(No Model.)
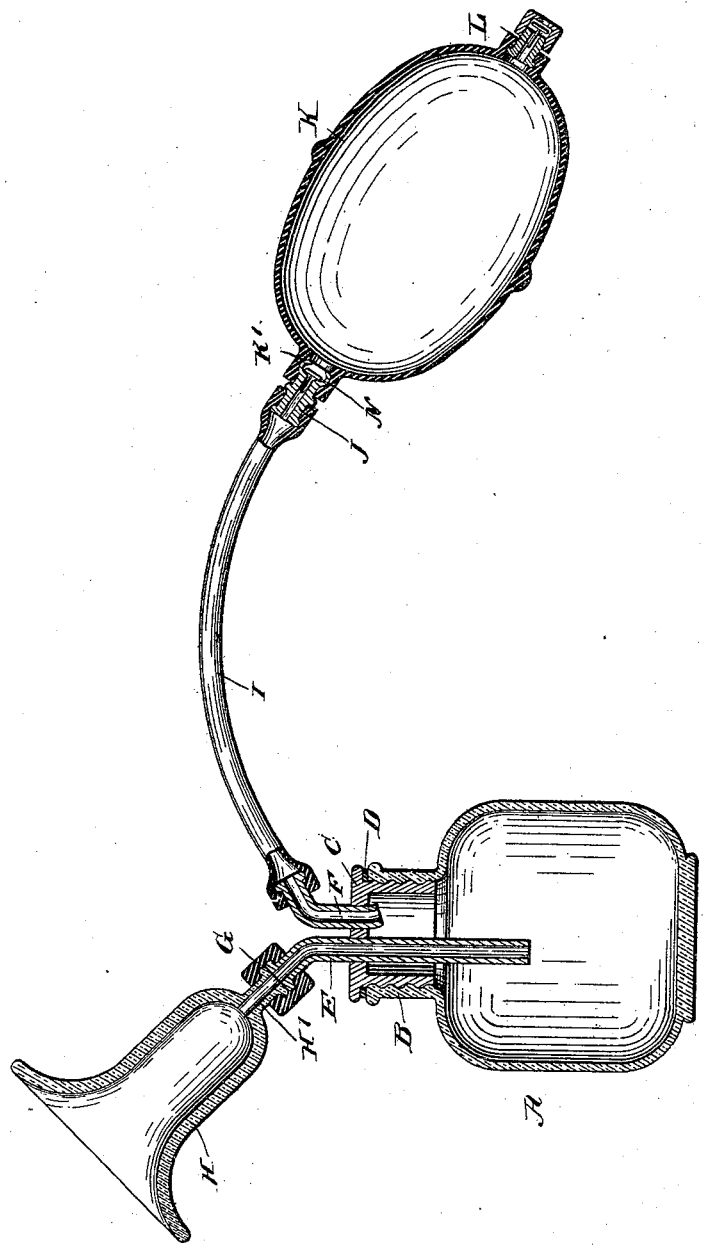
WITNESSES:
INVENTOR
William H. Martin
BY
ATTORNEYS

UNITED STATES PATENT OFFICE.

WILLIAM H. MARTIN, OF NEW YORK, N. Y.

BREAST-PUMP.

SPECIFICATION forming part of Letters Patent No. 684,078, dated October 8, 1901.

Application filed March 1, 1901. Serial No. 49,449. (No model.)

*To all whom it may concern:*

Be it known that I, WILLIAM H. MARTIN, a subject of the King of Great Britain, and a resident of the city of New York, borough of Manhattan, in the county and State of New York, have invented a new and Improved Breast-Pump, of which the following is a full, clear, and exact description.

The object of the invention is to provide a new and improved breast-pump which is simple and durable in construction, easily cleaned, and arranged to permit of drawing the milk from a sore or delicate breast to give instant relief to the patient without unnecessary irritation or causing or increasing soreness.

The invention consists of novel features and parts and combinations of the same, as will be fully described hereinafter and then pointed out in the claim.

Reference is to be had to the accompanying drawing, forming a part of this specification, in which the figure is a sectional side elevation of the improvement.

The improved pump is provided with a receptacle A, of glass or other suitable material, and formed with a threaded neck B, on which screws a cap C, the joint between the cap and the neck being rendered fluid-proof by a suitable washer D, interposed between the cap C and the neck D, as is plainly shown in the drawing. The cap C carries the rigid pipes E and F, of which the pipe E is connected at its outer end by a flexible coupling G with the apertured stem H' of a mouthpiece H, preferably made bell-shaped and adapted to engage a breast, at the nipple thereof, to draw the milk from the breast, as hereinafter more fully described. The outer end of the pipe E is bent outward and upward, and the mouthpiece stands in axial alinement with the outer bent end of the pipe, so that the mouthpiece stands at an angle to the receptacle, as is plainly shown in the drawing.
The pipe F is connected at its outer end with a flexible tube I, connected by a rigid coupling J with a hollow shank K' on a suction-bulb K, of an elastic material, such as rubber, the bulb being provided with a discharge-valve L, preferably located directly opposite the shank K'. In the coupling J is arranged a check-valve N, adapted to close the connection between the bulb K and the tube I when the bulb K is pressed, said valve opening when the pressure on the bulb K is released. As shown in the drawing, the pipe F extends a short distance into the cap C and the receptacle A, while the other pipe E extends to within a short distance of the bottom of the receptacle.

The operation is as follows: The mouthpiece H is applied to the breast, and then the operator presses the bulb K, so as to force the air contained in the bulb out through the valve L, and when the operator releases the pressure on the bulb K then the valve L closes and the valve N opens inwardly, and consequently the air in the receptacle A passes through the pipe F, tube I, and coupling J into the bulb K, thus creating a vacuum in the receptacle A, and thereby producing a suction in the mouthpiece H for drawing the milk from the breast. The milk passing into the mouthpiece H flows from the latter through the pipe E into the receptacle A. The above-described operation is repeated as often as is deemed necessary—that is, the operator alternately presses and releases the bulb to cause the milk to flow from the breast into the receptacle A.

From the foregoing it is evident that the device can be readily applied, and by the operator gently manipulating the bulb K very little, if any, irritation is caused to a sore or delicate breast, and consequently all unnecessary irritation or increasing soreness of the breast is completely avoided.

By having the flexible connection between the receptacle A and the suction-bulb the latter can be readily manipulated for forming a vacuum in the receptacle without disturbing the position of the mouthpiece on the breast, and hence the breast is not liable to be irritated by the use of the device. By having the flexible coupling G between the mouthpiece H and the pipe E the receptacle A if slightly moved does not affect the position of the mouthpiece on the breast; but the said coupling normally holds the mouthpiece in the angular position relative to the receptacle A to allow of conveniently and properly applying the mouthpiece to the breast, at the same time insuring an upright position of the receptacle A for the proper flow of the milk from the mouthpiece to the receptacle without danger of milk passing into the pipe F, tube I, and bulb K. It is understood that by extending the pipe F but a short distance into the receptacle A the milk is not liable to be drawn into said pipe, the tube I, and the bulb K when actuating the latter, as described. The receptacle A, besides forming a vacuum-bulb for the mouthpiece, also serves to receive the milk.

Having thus fully described my invention, I claim as new and desire to secure by Letters Patent—

A breast-pump, comprising a receptacle provided with a cap carrying a tube leading out through the cap, a mouthpiece adapted to engage the breast at the nipple, a flexible coupling connecting the mouthpiece with the said tube, and a suction-bulb connected with the receptacle through its cap for creating a vacuum in the receptacle, as and for the purpose set forth.

In testimony whereof I have signed my name to this specification in the presence of two subscribing witnesses.

WILLIAM H. MARTIN.

Witnesses:
 THEO. G. HOSTER,
 EVERARD BOLTON MARSHALL.